United States Patent
Reichert et al.

(10) Patent No.: US 6,193,779 B1
(45) Date of Patent: Feb. 27, 2001

(54) TANTALUM POWDER, METHOD FOR PRODUCING SAME POWDER AND SINTERED ANODES OBTAINED FROM IT

(75) Inventors: Karlheinz Reichert, Wolfenbüttel; Rüdiger Wolf, Vienenburg; Christine Rawohl, Hildesheim, all of (DE)

(73) Assignee: H. C. Starck GmbH & Co. KG, Goslar (DE)

(*) Notice: Subject to any disclaimer, the term of this patent is extended or adjusted under 35 U.S.C. 154(b) by 0 days.

(21) Appl. No.: 09/367,730

(22) PCT Filed: Feb. 9, 1998

(86) PCT No.: PCT/EP98/00698
§ 371 Date: Aug. 19, 1999
§ 102(e) Date: Aug. 19, 1999

(87) PCT Pub. No.: WO98/37248
PCT Pub. Date: Aug. 27, 1998

(30) Foreign Application Priority Data

Feb. 19, 1997 (DE) .............................. 197 06 416

(51) Int. Cl.[7] .............................. B22F 3/02; C22B 34/24
(52) U.S. Cl. .............................. 75/343; 75/369; 75/245
(58) Field of Search .............................. 75/343, 369, 245

(56) References Cited

U.S. PATENT DOCUMENTS

| Re. 32,260 | * | 10/1986 | Fry ........................................... 75/230 |
| 4,441,927 | * | 4/1984 | Getz et al. ............................... 75/229 |
| 4,537,641 | * | 8/1985 | Albrecht et al. ...................... 148/11.5 |
| 4,968,481 | | 11/1990 | Rerat ....................................... 419/23 |
| 5,234,491 | * | 8/1993 | Chang ..................................... 75/622 |
| 5,442,978 | | 8/1995 | Hildreth et al. ........................ 75/363 |
| 5,954,856 | * | 9/1999 | Pathare et al. .......................... 75/255 |

FOREIGN PATENT DOCUMENTS

| 19536013 | 4/1996 | (DE) . |
| 19536014 | 4/1996 | (DE) . |
| 0347668 | 9/1989 | (EP) . |
| 0744234 | 7/1996 | (EP) . |

* cited by examiner

*Primary Examiner*—Daniel J. Jenkins
(74) *Attorney, Agent, or Firm*—Joseph C. Gil; Diderico van Eyl

(57) ABSTRACT

The invention relates a tantalum powder free of alkali and fluorine, which for a relatively small primary particle size has comparatively large secondary particles and is suitable for producing capacitors with a specific charge of between 100,000 and 180,000 $\mu$FV/g at specific residual currents of less than 2nA/$\mu$FV.

30 Claims, 1 Drawing Sheet

Figure 1:
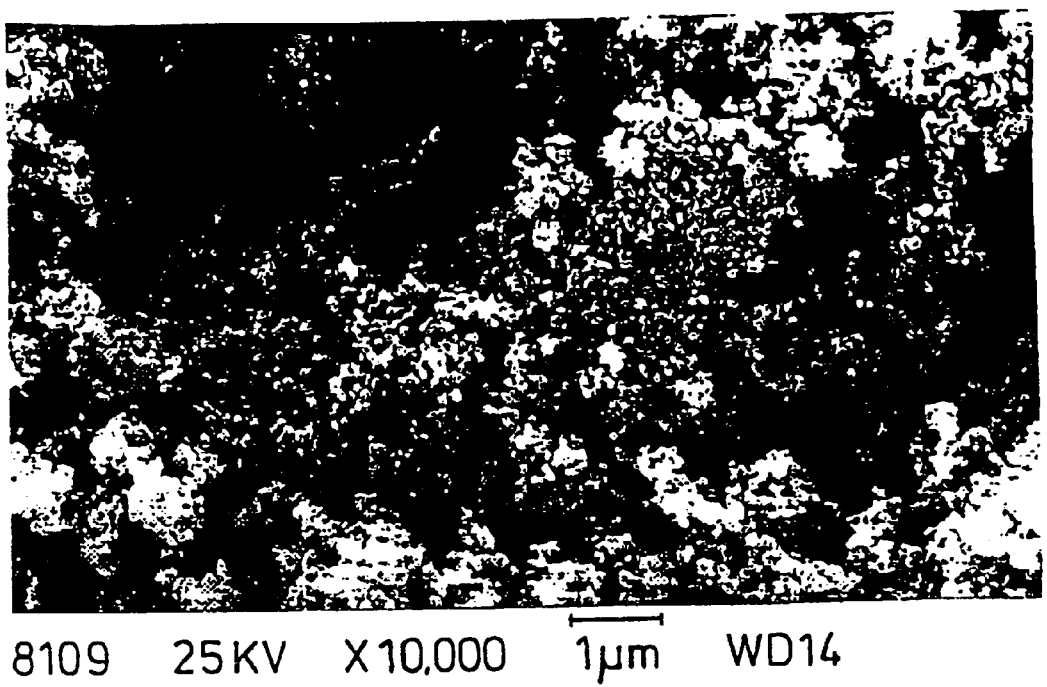

TANTALUM POWDER, METHOD FOR PRODUCING SAME POWDER AND SINTERED ANODES OBTAINED FROM IT

This application is a rule 371 of PCT/EP98/00698 of Feb. 9, 1998.

The present invention relates to a tantalum powder, to pressed, sintered anodes obtainable from the tantalum powder, and to a process for producing tantalum powders.

Metallic tantalum powder is usually produced by the reduction of $K_2TaF_7$ by means of sodium. The physical properties of tantalum powders, such as the grain size or specific surface for example, are controlled by the addition of inert salts such as KCl, NaCl, KF or NaF. As the proportion of inert salts is increased, the resulting tantalum powder becomes finer, i.e. the resulting metal surface increases. However, the throughput of tantalum metal in the reduction decreases, corresponding to the increasing inert salt concentration.

After the salts have been washed out, the tantalum powder is dried and is subjected to further purification by high-temperature treatment in a vacuum or in an inert gas atmosphere. In this agglomeration step, the specific surface is significantly reduced and the oxygen content of the powder is considerably increased. The oxygen content is reduced again by thermal treatments, by means of metals having a reducing action, particularly magnesium. Another consequence of this deoxidation step or steps is a slight reduction in the specific surface. In order to optimise the electrical properties of capacitors produced from these tantalum powders, the tantalum powders are treated with dopants containing phosphorus and/or boron.

The electrical properties of tantalum powders, such as their specific charge or their leakage current, are tested on a pressed, sintered anode which has subsequently been anodically oxidised, i.e. formed. The specific charge, expressed in $\mu FV/g$, is a measure of the capacitance of the capacitor, and is directly proportional to the metal surface. The leakage current, expressed in $nA/\mu FV$, is an indicator of how well a capacitor holds its charge.

In the sodium reduction of $K_2TaF_7$ in the molten salt which is usually carried out industrially, capacitor powders with specific charges of 18,000 to 70,000 $\mu FV/g$ are economically produced. To obtain tantalum powders of small primary particle size which are required for capacitors which have a high capacitance it is necessary to carry out the sodium reduction of $K_2TaF_7$ at a very high level of dilution (diluent salts: KCl, KF, NaCl) which results in smaller agglomerates (secondary particle size 1 to 5 $\mu m$ with a primary particle size of about 0.3 elm). The small dimensions of the agglomerates make it necessary to agglomerate this tantalum powder thermally (by pre-sintering), whereupon firstly unwanted impurities are removed and secondly the specific surface is reduced again. However, the favourable pore structure of the agglomerates for capacitor production, due to which capacitors with low leakage currents are obtained by forming, is only obtained by repeated pre-sintering with comminution of the agglomerates by removing them between sintering operations. Tantalum capacitor powders with very high capacitances are described in DE 195 36 013 A1. Specific charges up to 91,810 $\mu FV/g$ are obtained in sintered anodes produced therefrom, with the thermal agglomeration step which is otherwise customary being omitted. These tantalum powders contain troublesome impurities, such as fluoride for example, in concentrations >100 ppm. Part of the high fluoride content is decomposed when the anodes are sintered. The fluorides which are thereby evolved result in thermal corrosion in sintering furnaces. The fluoride which remains in the tantalum anode is probably responsible for the considerably increased leakage currents. Thus a tantalum powder which has been produced according to Example 6 of DE 195 36 013 A1 has an F content of 460 ppm and an Mg content of 200 ppm. Moreover, these powders have the disadvantage that their powder density is too low and the fracture strength of anodes pressed from them is too low compared with conventional powders which are available. Therefore, these powders have still not attained industrial importance. Furthermore, these tantalum powders are burdened with the disadvantage that they also contain residual contents of alkali, which even if they are only within the ppm range, make the leakage currents considerably worse.

Very finely divided powders are produced by the gas phase reduction of $TaCl_5$ with hydrogen. What are essentially discrete powders which are no longer free-flowing are obtained in this process. Due to the difficulty of processing them industrially, these powders have not been used in capacitor technology.

The object of the present invention is to provide a tantalum powder which does not have the aforementioned disadvantages. A further object of the present invention is to provide an economic process for producing tantalum powders which exhibit very high capacitances.

It has now been found that very finely divided tantalum powders which are already pre-sintered (agglomerates) are obtained by igniting a mixture of tantalum pentachloride and magnesium hydride, and that these tantalum powders are outstandingly suitable for the production of high capacitance capacitors. Due to the rapidly proceeding reaction, which is complete after only a few minutes, very small primary particles are produced, even without the use of diluent salts, which have typical dimensions of 50 to 300 nm, which come into contact with each other on account of the high content of tantalum in the reaction mixture and which sinter within the time of reaction due to their high sintering activity. This results in a foam-like, partially sintered, open-pored cake from which outstandingly free-flowing agglomerates with average secondary particle sizes of 10 to 50 $\mu m$ or more are obtained by crushing and sieving. After washing and drying, these agglomerates have very high BET specific surfaces of 1.5 to 10 $m^2/g$.

Accordingly, the present invention relates to a process for producing tantalum powder by igniting a mixture of tantalum pentachloride and magnesium hydride in an inert gas atmosphere and subsequently washing the reaction product with mineral acids.

The reaction of a homogenised mixture of tantalum pentachloride and magnesium hydride is preferably conducted in a tantalum reduction vessel. A thin tantalum wire is preferably embedded as an igniter in the top layer of this homogenised mixture, and can be particularly elegantly connected by an externally entering lead wire to a source of low voltage, whereupon it can be brought to bright red heat. This ignitable arrangement is accommodated in a protective chamber flushed with argon. After this reaction product, which has been heated to white heat due to the strongly exothermic reaction and which exists in the form of a partially sintered porous cake, has cooled, it is coarsely broken up, washed with mineral acids and dried. A sulphuric acid/hydrogen peroxide solution is preferably used as the washing liquid. Washing is continued until the wash water is free from chloride.

The quantitative ratio of the starting materials for the reaction mixture is not critical, since both magnesium and hydrogen are available for reduction after they have been released from the magnesium hydride. Accordingly, 1.25 to 1.3 moles of magnesium hydride can be used per mole of pentachloride. However, due to the low boiling temperature of tantalum pentachloride and due to the low decomposition temperature of magnesium hydride, losses in yield are observed at low molar ratios of the starting materials. A molar ratio of tantalum pentachloride to magnesium hydride of 2 to 3 is therefore preferred. Yields of 80 to 90% with respect to the tantalum used are then obtained. It is anticipated that the yield can be increased further if the reaction is conducted under pressure, in an autoclave for example.

Magnesium hydride of formula MgH, is preferably used as the reducing agent, where x is greater than 1.2 and is most preferably greater than 1.6.

By means of the invention, tantalum powders which consist of sintered primary particles are produced for the first time, wherein the primary particles have a particle size of 30 to 300 nm, preferably 30 to 150 nm, most preferably less than 100 nm, and wherein the secondary particles which are obtained by the sintering of the primary particles have a D 50 size which is greater than 10 $\mu$m, preferably greater than 13 $\mu$m.

The D 50 value is determined by the Mastersizer method according to ASTM B 822 after ultrasonic treatment for 15 minutes to effect de-agglomeration.

Due to the secondary particle structure of the powders according to the invention, these particles exhibit outstanding flow properties which are important for further processing. The flowability values for the powders according to the invention, as determined by the Hall flow flowability test according to ASTM-B-213, are typically 100 to 140 seconds through a 0.1 inch funnel, and are 15 to 25 seconds through a 0.2 inch funnel.

Moreover, the powders according to the invention are free from alkalies and chloride. In particular, their alkali contents are less than 2 ppm and their fluoride contents are below a tolerable limit of 20 ppm, preferably less than 5 ppm. Fluorine, sodium and potassium in particular generally cannot be detected in the powders according to the invention. The oxygen content ranges from 4000 to 20,000 ppm.

The BET specific surface is within the range from 1.5 to 10 $m^2/g$, and is preferably higher than 2 $m^2/g$, most preferably between 3 and 6 $m^2/g$.

According to a preferred embodiment of the invention, substances which inhibit the growth of nuclei and which inhibit sintering are added to the reaction mixture before ignition, so that the resulting powders are doped with these substances. Substances which contain phosphorus and/or nitrogen are preferred as dopants.

The tantalum powders which are preferred according to the invention therefore have phosphorus contents of 30 to 2000 ppm, preferably 300 to 2000 ppm of phosphorus. The nitrogen content of the tantalum powders according to the invention can range from 100 to 15,000 ppm, and is preferably at least 500 ppm of nitrogen.

Elemental phosphorus is preferably used as the phosphorus dopant, and is most preferably used in the form of powdered red phosphorus. The dopant can be added to the ignitable mixture in amounts of up to 5000 ppm.

Ammonium salts comprising a volatile anion component, such as ammonium chloride for example, are suitable as the nitrogen dopant. Nitrogen or ammonia are also suitable.

If doping is effected with nitrogen and phosphorus simultaneously, ammonium phosphate can advantageously be used as the dopant.

Even though the present invention was developed using magnesium hydride as the reducing agent, it can be assumed that calcium hydride can also be used as a reducing agent. Calcium hydride essentially differs from magnesium hydride in that it does not decompose at a low temperature of 280 to 300° C. but has a melting temperature which is higher than 1000° C. However, it can be assumed from this that the reaction proceeds rapidly after ignition so that an intermediate stage which is characterised by the decomposition of magnesium hydride has no significant effect on the reaction. In particular, only insignificant effects on the reaction product are anticipated. Accordingly, the present invention relates when worded more generally to a process for producing tantalum powder by the ignition of a mixture of tantalum pentachloride and alkaline earth hydrides, wherein the mixture optionally contains dopants which contain phosphorus and/or nitrogen.

After the reaction is complete, the tantalum powder which is produced in this manner is isolated by washing with a mineral acid, e.g. sulphuric acid, particularly with the addition of hydrogen peroxide. The tantalum powder which is washed free from chloride in this manner can be coated with dopants which contain phosphorus for the purpose of doping it further. If the oxygen content after drying and at a predetermined specific surface is of the desired concentration, the material can be used directly, without further treatment, for the production of tantalum capacitors. If it is desired to reduce the oxygen concentration in the tantalum powder, the isolated, dried tantalum powder is preferably subjected to a deoxidation step. This is preferably effected by the addition of admixed magnesium turnings at a low temperature of 650 to 900° C., preferably 750 to 850° C., over a period of ½ to 10 hours, preferably 2–4 hours. The tantalum powder which is obtained in this manner is then freed from residual magnesium by washing with mineral acids, optionally with the addition of hydrogen peroxide, and is dried. Sulphuric acid has proved to be particularly suitable as the acid. After leaching out the residual magnesium, doping with phosphorus can be effected again. This is preferably effected by impregnation with dopants which are present in solution. The oxygen content of tantalum powders used for the production of tantalum capacitors is preferably between 4000 and 20,000 ppm, depending on the specific surface. In addition, the nitrogen content is preferably adjusted to values of 100–15,000 ppm, which can be achieved in particular by adding ammonia during deoxidation. This "deoxidation" step is preferably carried out even if the oxygen content of the powder is already within the desired range. "Deoxidation" then serves for the reduction of magnesium and chlorine residues from the reaction of the ignitable reaction mixture. The presence of magnesium has the effect that no additional oxygen diffuses into the powder during gentle heat treatment. Sintered anodes produced from corresponding tantalum powders are characterised by low leakage currents, preferably <2 nA/$\mu$FV, most preferably less than 1 nA/$\mu$FV.

The tantalum powder according to the invention is further characterised in that it is suitable for the production of electrolytic capacitors with a specific charge of 120,000 to 180,000 $\mu$FV/g at a specific leakage current of less than 2 nA/$\mu$FV, by sintering for 10 minutes at a temperature of 1100 to 1300° C. and forming at 16 V.

Pressed anodes which exhibit a surprisingly high anode breaking strength can be obtained from the tantalum powder according to the invention. The present invention also relates to these pressed anodes. The breaking strength of these pressed anodes according to the invention, measured according to Chatillon at a pressed density of 5 g/$cm^3$, is between 3 and 8 kg, preferably between 4 and 7 kg. In this respect, testing is conducted on cylindrical test anodes pressed from tantalum powder, which have a weight of 0.521 g, a diameter of 5.1 mm, a length of 5.1 mm, and a pressed density of 5.0 g/cm$^3$. In contrast, the pressed anodes which can be obtained according to DE 1 9536 013 A1 have anode breaking strengths of only <4 kg.

The sintered anodes produced from the tantalum powder according to the invention, which are obtained by sintering the powder for 10 minutes at temperatures of 1150–1300° C. and forming at 16–30 volts, have specific charges of 80,000–170,000 μFV/g, preferably of 90,000–160,000 μFV/g. The leakage currents of the sintered anodes according to the invention are most preferably ≦2 nA/μFV.

EXAMPLE 1

1st step: Reduction

A mixture of 200 g TaCl$_5$ and 22 g MgH$_2$ (MgH$_2$ content 90%) was divided into three equal amounts and these were reacted, separately from each other, by electrical ignition under an Ar atmosphere. Hydrogen chloride was evolved during the reactions. The reactions occurred within a few minutes.

2nd step: Washing and drying

After passing it through a sieve of mesh aperture 400 μm, the cooled reaction product was washed with sulphuric acid/hydrogen peroxide solution until the wash water was substantially free from chloride. The material was freed from the bulk of the acid by repeated decantation and was washed with water on a suction filter until it was acid-free. It was carefully dried at 45° C. and was sieved to minus 220 μm.

The following analysis data was obtained for the tantalum powder produced in this manner:

| | |
|---|---|
| oxygen | 3.3 % |
| magnesium | 1770 ppm |
| sodium | <1 ppm |
| potassium | <1 ppm |
| fluoride | <2 ppm |
| chloride | 361 ppm |
| grain size by means of Fischer sub-sieve sizer | 0.37 μm |
| Scott powder density | 9.5 g/inch$^3$ |
| BET specific surface (Quantasorb 3-point) | 9.12 m$^2$/g |
| Mastersizer (ASTM-B-822) D 10 | 1.03 μm |
| 15 minutes ultrasonic pretreatment D 50 | 10.50 μm |
| D90 | 32.33 μm |

Amount of tantalum metal produced: 74 g, corresponding to a yield of 73.7%.

3rd step: Deoxidation and acid-leaching 40 g of the primary powder were mixed with 7.8 g magnesium turnings (=twice the stoichiometric amount calculated based on the oxygen content) and were held for 2 hours at 900° C. in a covered tantalum boat in a tube furnace under a protective gas (argon). After cooling, the material was passivated by the gradual admission of air over about 18 hours, so that it could safely be handled in air. The magnesium residues were dissolved from the tantalum powder with a solution containing 8% sulphuric acid and 1.8% hydrogen peroxide. The material was subsequently washed with water until it was acid-free, dried, and sieved to <220 μm.

| Analysis: | oxygen | 7700 ppm |
|---|---|---|
| | nitrogen | 2600 ppm |
| | BET specific surface (Quantasorb 3-point) | 2.35 m$^2$/g |

The resulting powder was pressed to form anodes, sintered and formed, in order subsequently to determine the specific charge and leakage currents. The conditions for anode production and the electrical properties measured thereon are given in Table 2 (see sample 1).

EXAMPLE 2

1st step: Reduction

A mixture of 434 g TaCl$_5$ and 48 g MgH$_2$ (MgH$_2$ content 90%) was reacted by electrical ignition under an argon atmosphere.

2nd step: Washing and drying

See Example 1.

The following analysis data was obtained for the tantalum powder produced in this

| | |
|---|---|
| oxygen | 2.2 % |
| magnesium | 730 ppm |
| sodium | <1 ppm |
| potassium | <1 ppm |
| fluoride | <2 ppm |
| chloride | 409 ppm |
| grain size by means of Fischer sub-sieve sizer | 0.33 μm |
| Scott powder density | 12.8 g/inch$^3$ |
| BET specific surface (Quantasorb 3-point) | 4.73 m$^2$/g |
| Mastersizer D 10 | 0.94 μm |
| 15 minutes ultrasonic pretreatment D 50 | 9.84 μm |
| D90 | 31.88 μm |

Amount of tantalum metal produced: 151 g, corresponding to a yield of 69%.

3rd step: Doping and low-temperature deoxidation, and acid-leaching 110 g of the tantalum powder were mixed with 7.26 g magnesium turnings (=twice the stoichiometric amount calculated based on the oxygen content) and were held for 2 hours at 850° C. in a covered tantalum boat in a retort under a protective gas (argon). After cooling, the material was passivated by the gradual admission of air over about 18 hours, so that it could safely be handled in air. The magnesium residues were dissolved out with a solution containing 8% sulphuric acid and 1.8% hydrogen peroxide. The tantalum powder was subsequently washed with water until it was acid-free, and the moist material from the suction filter was doped with 100 ppm phosphorus by impregnation with 11 ml of an ammonium dihydrogen phosphate solution which contained 1 mg P per ml of solution, and was dried and sieved to <220 μm.

| Analysis: | oxygen | 7550 ppm |
|---|---|---|
| | nitrogen | 2820 ppm |
| | BET specific surface (Quantasorb 3-point) | 2.2 m$^2$/g |
| | Mg | 80 ppm |
| | Cl | 59 ppm |

The resulting powder was pressed to form anodes, sintered and formed, in order subsequently to determine the specific charge and leakage currents. The conditions for anode production and the electrical properties measured thereon are given in Table 2 (see sample 2A).

4th step: Repeated deoxidation and acid leaching, repeated doping 70 g of the material obtained as above were deoxidised again for 2 hours at 850° C. with 1.6 g magnesium turnings, as described in step 3, were treated with a solution containing 8% sulphuric acid and 1.8% hydrogen peroxide, were washed free from acid and were again doped with 50 ppm phosphorus, so that the total phosphorus content was then 150 ppm.

| Analysis: | oxygen | 6170 ppm |
| | nitrogen | 3210 ppm |
| | BET specific surface (Quantasorb 3-point) | 1.75 m²/g |
| | Mg | 60 ppm |

The resulting powder was pressed to form anodes, sintered and formed, in order subsequently to determine the specific charge and leakage currents. The conditions for anode production and the electrical properties measured thereon are given in Table 2 (see sample 2B).

EXAMPLE 3

1st step: Reduction

A mixture of 1000 g $TaCl_5$ and 115.5 g $MgH_2$ ($MgH_2$ content 90%) was doped with 71 mg red phosphorus and was subsequently reacted as in Example 2.

2nd step: Washing and drying

See Example 1.

The following analysis data was obtained for the tantalum powder:

| oxygen | 2.6 % |
| nitrogen | 2820 ppm |
| phosphorus | 150 ppm |
| magnesium | 14 ppm |
| sodium | <1 ppm |
| potassium | <1 ppm |
| fluoride | <2 ppm |
| chloride | 784 ppm |
| grain size by means of Fischer sub-sieve sizer | 0.34 μm |
| Scott powder density | 13.4 g/inch³ |
| BET specific surface (Quantasorb 3-point) | 5.74 m²/g |
| Mastersizer D 10 | 0.87 μm |
| 15 minutes ultrasonic pretreatment D 50 | 10.12 μm |
| D90 | 30.19 μm |

Amount of tantalum metal produced: 329 g, corresponding to a yield of 65%. The resulting powder was pressed to form anodes, sintered and formed, in order subsequently to determine the specific charge and leakage currents. The conditions for anode production and the electrical properties measured thereon are given in Table 2 (see sample 3A).

3rd step: Low-temperature deoxidation, and acid-leaching 100 g of the tantalum powder were mixed with 7.8 g magnesium turnings (=twice the stoichiometric amount calculated based on the oxygen content) and were subjected to deoxidation for 4 hours at 750° C. as described in Example 2. The magnesium residues were dissolved out with a solution containing 26% sulphuric acid and 6% hydrogen peroxide. The product was washed with water until it was acid-free, dried at 45° C., sieved to minus 220 sum and homogenised.

| Analysis: | oxygen | 9970 ppm |
| | nitrogen | 6090 ppm |
| | BET specific surface (Quantasorb 3-point) | 3.12 m²/g |

The resulting powder was pressed to form anodes, sintered and formed, in order subsequently to determine the specific charge and leakage currents. The conditions for anode production and the electrical properties measured thereon are given in Table 2 (see sample 3B).

4th step: Doping

Part of the deoxidised powder was additionally doped with 150 ppm phosphorus by impregnation with an ammonium dihydrogen phosphate solution, and was dried and sieved to <220 μm.

The resulting powder was pressed to form anodes, sintered and formed, in order subsequently to determine the specific charge and leakage currents. The conditions for anode production and the electrical properties measured thereon are given in Table 2 (see sample 3C).

EXAMPLE 4

1st step: Reduction

A mixture of 300 g $TaCl_5$ and 63 g $MgH_2$ ($MgH_2$ content 90%) was doped with 151 mg red phosphorus (=151 mg P) and was subsequently reacted as in Example 2. Combustion took place under a reduced flow of argon. As a result of this, partial nitriding by atmospheric nitrogen occurred during the reduction.

2nd step: Washing and drying

See Example 1.

The following analysis data was obtained for the tantalum powder:

| oxygen | 1.2 % |
| nitrogen | 1.2 % |
| phosphorus | 680 ppm |
| magnesium | 1200 ppm |
| sodium | <1 ppm |
| potassium | <1 ppm |
| fluoride | <2 ppm |
| chloride | 71 ppm |
| grain size by means of Fischer sub-sieve sizer | 0.57 μm |
| Scott powder density | 17.3 g/inch³ |
| BET specific surface (Quantasorb 3-point) | 3.99 m²/g |
| Mastersizer D 10 | 1.09 μm |
| 15 minutes ultrasonic pretreatment D 50 | 13.63 μm |
| D90 | 40.18 μm |

Amount of tantalum metal produced: 129 g, corresponding to a yield of 85%.

3rd step: Low-temperature deoxidation, and acid-leaching 75 g of the tantalum powder were mixed with 2.7 g magnesium turnings (=twice the stoichiometric amount calculated based on the oxygen content) and were subjected to deoxidation for 4 hours at 750° C. as described in Example 2, and to an acid treatment as in Example 1.

| Analysis: | oxygen | 12000 ppm |
| | nitrogen | 12000 ppm |
| | BET specific surface (Quantasorb 3-point) | 3.92 m²/g |
| | Mg | 85 ppm |
| | Cl | 23 ppm |

The resulting powder was pressed to form anodes, sintered and formed, in order subsequently to determine the specific charge and leakage currents. The conditions for anode production and the electrical properties measured thereon are given in Table 2 (see sample 4).

EXAMPLE 5

1st step: Reduction

A mixture of 300 g $TaCl_5$, 63 g $MgH_2$ ($MgH_2$ content 90%) and 76 mg red phosphorus was reacted as in Example 4.

2nd step: Washing and drying

See Example 1.

The following analysis data was obtained for the tantalum powder:

| | |
|---|---|
| oxygen | 12000 ppm |
| nitrogen | 14000 ppm |
| phosphorus | 360 ppm |
| magnesium | 460 ppm |
| sodium | <1 ppm |
| potassium | <1 ppm |
| fluoride | <2 ppm |
| chloride | 71 ppm |
| Scott powder density | 19.4 g/inch$^3$ |
| BET specific surface (Quantasorb 3-point) | 3.35 m$^2$/g |
| Mastersizer D 10 | 1.73 μm |
| 15 minutes ultrasonic pretreatment D 50 | 19.08 μm |
| D90 | 56.31 μm |

Amount of tantalum metal produced: 131 g, corresponding to a yield of 86.4%.

3rd step: Low-temperature deoxidation, and acid-leaching

See Example 3.

| Analysis: | oxygen | 10000 ppm |
|---|---|---|
| | nitrogen | 14000 ppm |
| | BET specific surface (Quantasorb 3-point) | 3.18 m$^2$/g |
| | Mg | 75 ppm |
| | Cl | 30 ppm |

The resulting powder was pressed to form anodes, sintered and formed, in order subsequently to determine the specific charge and leakage currents. The conditions for anode production and the electrical properties measured thereon are given in Table 2 (see sample 5).

EXAMPLE 6

1st step: Reduction

A mixture of 300 g $TaCl_5$ and 63 g $MgH_2$ ($MgH_2$ content 90%) was reacted as in Example 1, whilst flushing with argon.

2nd step: Washing and drying

See Example 1.

The following analysis data was obtained for the tantalum powder:

| | |
|---|---|
| oxygen | 1.1 % |
| nitrogen | 4360 ppm |
| phosphorus | <1 ppm |
| magnesium | 980 ppm |
| sodium | <1 ppm |
| potassium | <1 ppm |
| fluoride | <2 ppm |
| chloride | 258 ppm |
| Primary grain (from SEM) | ≦300 nm |
| Scott powder density | 24.3 g/inch$^3$ |
| BET specific surface (Quantasorb 1-point) | 2.45 m$^2$/g |
| Mastersizer D 10 | 3.30 μm |
| 15 minutes ultrasonic pretreatment D 50 | 33.14 μm |
| D 90 | 114.95 μm |

Amount of tantalum metal produced: 133 g, corresponding to a yield of 87.7%.

3rd step: Low-temperature deoxidation, and acid-leaching 75 g of the tantalum powder and 2.47 g magnesium turnings (=twice the stoichiometric amount calculated based on the oxygen content)—further treatment as in Example 3.

| Analysis: | oxygen | 7100 ppm |
|---|---|---|
| | nitrogen | 4460 ppm |
| | BET specific surface (Quantasorb 3-point) | 199 m$^2$/g |

The resulting powder was pressed to form anodes, sintered and formed, in order subsequently to determine the specific charge and leakage currents. The conditions for anode production and the electrical properties measured thereon are given in Table 2 (see sample 6).

EXAMPLE 7

1st step: Reduction

A mixture of 300 g $TaCl_5$, 63 g $MgH_2$ ($MgH_2$ content 90%) and 152 mg red phosphorus was reacted whilst flushing more intensively with argon, so that the entry of air was excluded.

2nd step: Washing and drying

See Example 1.

The following analysis data was obtained for the tantalum powder:

| | |
|---|---|
| oxygen | 1.4 % |
| nitrogen | 144 ppm |
| phosphorus | 780 ppm |
| magnesium | 45 ppm |
| sodium | <1 ppm |
| potassium | <1 ppm |
| fluoride | <2 ppm |
| chloride | 100 ppm |
| Primary grain (SEM) | ≦150 nm |
| Scott powder density | 18.1 g/inch$^3$ |
| grain size by means of Fischer sub-sieve sizer | 0.76 μm |
| BET specific surface (Quantasorb 1-point) | 4.02 m$^2$/g |
| Mastersizer D 10 | 2.25 μm |
| 15 minutes ultrasonic pretreatment D 50 | 23.51 μm |
| D 90 | 58.43 μm |

Amount of tantalum metal produced: 128 g, corresponding to a yield of 84.3%.

3rd step: Low-temperature deoxidation, and acid-leaching 94 g of the tantalum powder and 4.00 g magnesium turnings (=twice the stoichiometric amount calculated based on the oxygen content)—further treatment as in Example 3.

| Analysis: | oxygen | 11000 ppm |
|---|---|---|
| | nitrogen | 752 ppm |
| | BET specific surface (Quantasorb 3-point) | 3.52 m$^2$/g |

The resulting powder was pressed to form anodes, sintered and formed, in order subsequently to determine the specific charge and leakage currents. The conditions for anode production and the electrical properties measured thereon are given in Table 2.

EXAMPLE 8

1st step: Reduction

A mixture of 300 g $TaCl_5$, 63 g $MgH_2$ ($MgH_2$ content 90%) and 304 mg red phosphorus was reacted whilst flushing more intensively with argon, so that the entry of air was excluded.

2nd step: Wash g and drying

See Example 1.

The following analysis data was obtained for the tantalum powder:

| | |
|---|---|
| oxygen | 1.5 % |
| nitrogen | 240 ppm |
| phosphorus | 1700 ppm |
| magnesium | 65 ppm |
| sodium | <1 ppm |
| potassium | <1 ppm |
| fluoride | <2 ppm |
| chloride | 79 ppm |
| Primary grain (SEM) | ≦100 nm |
| Scott powder density | 17.2 g/inch$^3$ |
| by means of Fischer Sub Sieve Sizer | 0.55 μm |
| BET specific surface (Quantasorb 3-point) | 4.82 m$^2$/g |
| Mastersizer D 10 | 1.33 μm |
| 15 minutes ultrasonic pretreatment D 50 | 15.89 μm |
| D 90 | 49.19 μm |

The grain size is illustrated by the SEM photograph in FIG. 1.

Amount of tantalum metal produced: 126 g, corresponding to a yield of 83.0%.

3rd step: Low-temperature deoxidation, and acid-leaching 99 g of the tantalum powder and 4.47 g magnesium turnings (=twice the stoichiometric amount calculated based on the oxygen content) were mixed and were deoxidised for 4 hours at 750° C. The magnesium residues were dissolved with a solution containing 8% sulphuric acid and 1.8% hydrogen peroxide.

| Analysis: | oxygen | 12000 ppm |
|---|---|---|
| | nitrogen | 1440 ppm |
| | BET specific surface (Quantasorb 3-point) | 3.66 m$^2$/g |

The resulting powder was pressed to form anodes, sintered and formed, in order subsequently to determine the specific charge and leakage currents. The conditions for anode production and the electrical properties measured thereon are given in Table 2 (sample 8).

TABLE 1

Electrical test

| Sample | PD pressed density (g/cm$^3$) | Chatillon anode breaking strength (kg) PD = 5.0 g/cm$^3$ | Sintering temperature (° C.) | Sintered density (g/cm$^3$) | Forming (V) | Capacitance (CV/g) | Leakage current (nA/μFV) |
|---|---|---|---|---|---|---|---|
| 1 | 5 | n.d. | 1200 | 4.6 | 16 | 79119 | 8.18 |
| 2A | 5 | n.d. | 1200 | 4.9 | 16 | 84712 | 3.95 |
| 2B | 5 | 3.1 | 1200 | 4.5 | 16 | 92113 | 3.97 |
| 3A | 5.75 | 5.34 | 1200 | 6.1 | 16 | 114456 | 1.63 |
| 3B | 5 | n.d. | 1200 | 4.9 | 16 | 119121 | 1.63 |
| 3C | 5 | n.d. | 1200 | 4.9 | 16 | 123678 | 2.01 |
| 4 | 5 | a5.81 | 1200 | 4.6 | 16 | 149910 | 2.19 |
| | 5 | | 1250 | 4.8 | 16 | 143936 | 0.77 |
| | 5 | | 1300 | 5.5 | 16 | 111879 | 4.1 |
| | 5 | | 1250 | 5 | 30 | 84724 | 2.7 |
| | 5 | | 1250 | 5 | 20 | 106701 | 1.95 |
| 5 | 5 | 7.05 | 1200 | 4.7 | 16 | 133428 | 3.32 |
| | 5 | | 1250 | 4.8 | 16 | 123626 | 0.973 |
| | 5 | | 1300 | 5.6 | 16 | 104041 | 4.48 |
| | 5 | | 1300 | 5.9 | 30 | 80184 | 3.24 |
| 6 | 5 | 4.56 | 1200 | 5 | 16 | 95742 | 4.57 |
| | 5 | | 1250 | 5 | 16 | 88500 | 1.39 |
| 7 | 5 | 6.5 | 1200 | 4.7 | 16 | 155911 | 1.58 |
| | 5 | | 1250 | 5.2 | 16 | 144255 | 0.69 |
| 8 | 5 | 6.5 | 1200 | 4.8 | 16 | 151745 | 1.22 |
| | 5 | | 1250 | 5.8 | 16 | 130031 | 0.67 |

Anode weight: 0.05 g
Sintering time: 10 minutes

EXAMPLES 9–16

1st step: Reduction

A mixture of 300 g $TaCl_5$, 63 g $MgH_2$, x mg red phosphorus and y g $NH_4Cl$ was reacted by igniting it electrically under an argon atmosphere (see Table 2).

TABLE 2

| | P | $NH_4Cl$ |
|---|---|---|
| | x | y |
| Example | (mg) | (mg) |
| 9 | 0 | 0 |
| 10 | 152 | 0 |
| 11 | 304 | 0 |
| 12 | 0 | 2.32 |
| 13 | 0 | 4.64 |
| 14 | 152 | 1.16 |

TABLE 2-continued

| Example | P x (mg) | NH₄Cl y (mg) |
|---|---|---|
| 15 | 152 | 2.32 |
| 16 | 152 | 4.64 |

2nd step: Washing and drying

The cooled reaction product was washed with a sulphuric acid/hydrogen peroxide solution in order to remove the magnesium chloride. The material was freed from the bulk of the acid by decanting once or twice and was washed with water on a suction filter until free from acid. It was dried at 45° C. and sieved to minus 400 μm. Table 3 shows the relationship between the content of dopant and the specific surface.

TABLE 3

| Example | P x ppm | N y ppm | BET specific surface (Quantasorb) (m²/g) | Na/K content (ppm) | F content (ppm) |
|---|---|---|---|---|---|
| 9 | 0 | 0 | 2.30 | <2 | <5 |
| 10 | 1000 | 0 | 4.02 | <2 | <5 |
| 11 | 2000 | 0 | 4.82 | <2 | <5 |
| 12 | 0 | 4000 | 3.24 | <2 | <5 |
| 13 | 0 | 8000 | 4.05 | <2 | <5 |
| 14 | 1000 | 2000 | 3.94 | <2 | <5 |
| 15 | 1000 | 4000 | 4.15 | <2 | <5 |
| 16 | 1000 | 8000 | 5.29 | <2 | <5 |

3rd step: Low temperature deoxidation and acid leaching

The tantalum powder were mixed with twice the stoichiometric amount of magnesium turnings (calculated based on the oxygen content) and were held for 4 hours at 750° C. in a covered tantalum boat in a retort under a protective gas (argon). After cooling, the material was passivated by the gradual admission of air over about 18 hours, so that it could safely be handled in air. The magnesium residues were dissolved out with a solution containing 8% sulphuric acid and 1.8% hydrogen peroxide. The tantalum powder was subsequently washed with water until it was acid-free, and was dried at 45° C. and sieved to minus 400 μm.

The resulting powder was pressed to form anodes, sintered and formed, in order subsequently to determine the specific charge and the leakage currents (see Table 4).

| | |
|---|---|
| Anode weight | 0.0466 g |
| Pressed density | 5.0 g/cm³ |
| Forming voltage | 16 V |

TABLE 4

| Example | Chatillon anode breaking (kg) strength PD = 5.0 g/cm³ | Sintering temperature (° C.) | Sintered density (g/cm³) | Capacitance (CV/g) | Leakage current (nA/μFV) |
|---|---|---|---|---|---|
| 9 | 6.64 | 1200 | 5.1 | 103,027 | 3.0 |
| | | 1250 | 5.3 | 80,681 | 1.8 |
| 10 | 6.50 | 1200 | 4.6 | 147,489 | 0.5 |
| | | 1250 | 5.2 | 143,895 | 1.7 |
| 11 | 6.50 | 1200 | 4.4 | 155,621 | 0.6 |
| | | 1250 | 5.5 | 133,532 | 1.9 |
| 12 | 4.96 | 1200 | 5 | 107,201 | 2.0 |
| | | 1250 | 5.5 | 84,343 | 1.9 |
| 13 | 5.14 | 1200 | 5.3 | 109,480 | 2.9 |
| | | 1250 | 5.7 | 86,875 | 1.3 |
| 14 | 5.48 | 1200 | 5 | 148,921 | 1.8 |
| | | 1250 | 5.3 | 127,065 | 4.0 |
| 15 | 7.37 | 1150 | 5 | 173,696 | 0.8 |
| | | 1200 | 5.1 | 160,922 | 1.7 |
| | | 1200 | 5.1 | 108,526 | |
| 16 | 7.52 | 1200 | 5.2 | 175,300 | 1.4 |

What is claimed is:

1. Tantalum powder which is free from alkali and fluorine, with a primary grain size of 50 to 300 nm and a D 50 value of the secondary grain size (ASTM-B-288) greater than 10 μm.

2. Tantalum powder according to claim 1, with a phosphorus content of 30 to 3000 ppm.

3. Tantalum powder according to claim 1 or 2, with an oxygen content of 4000 to 20000 ppm and a nitrogen content of 100 to 15000 ppm.

4. Tantalum powder according to either of claim 1 or 2, with a BET specific surface of 2 to 6 m²/g.

5. Tantalum powder according to either of claim 1 or 2, with an alkali content of less than 2 ppm.

6. Tantalum powder according to either of claim 1 or 2, with a fluorine content of less than 20 ppm.

7. Tantalum powder, which after sintering at a temperature between 1100 and 1300° C. for 10 minutes and forming at 16 volts has a specific charge of 120,000 to 180,000 μFV/g at a leakage current of less than 2 nA/μFV.

8. Pressed anodes obtainable from tantalum powders according to either of claim 1 or 2, characterized in that the anode breaking strength measured according to Chatillon at a pressed density of 5.0 g/cm³ and for an anode weight of 0.521 kg is between 3 and 8 kg.

9. Sintered anodes obtained by sintering pressed tantalum powders according to either of claim 1 or 2 at temperatures of 1150 to 1300° C. and forming at 16 to 30 volts, characterized in that they have specific charges of 80,000 to 170,000 μFV/g.

10. A process for producing tantalum powders according to either of claim 1 or 2, characterized in that a mixture of tantalum chloride and alkaline earth metal hydrides is reacted by way of an ignition under an inert gas atmosphere, and the tantalum powder which is thereby formed is isolated by washing with mineral acids and is dried.

11. A process according to claim 10, characterized in that the mixture contains substances containing phosphorus and/or nitrogen as dopants.

12. A process according to claim 10, characterized in that the isolated, dried tantalum powder is subjected to deoxidation.

13. A process according to claim 11 wherein the isolated, dried tantalum powder is subjected to deoxidation.

14. Tantalum powder according to claim 3 with a BET specific surface of 2 to 6 m²/g.

15. Tantalum powder according to claim 3 with an alkali content of less than 200 ppm.

16. Tantalum powder according to claim 4 with an alkali content of less than 200 ppm.

17. Tantalum powder according to claim 3 with a fluorine content of less than 20 ppm.

18. Tantalum powder according to claim 4 with a fluorine content of less than 20 ppm.

19. Tantalum powder according to claim 5 with a fluorine content of less than 20 ppm.

20. Pressed anodes obtained from tantalum powder according to claim 3, characterized in that the anode breaking strength measured according to Chatillon at a pressed density of 5.0 g/cm$^3$ and for an anode weight of 0.521 kg is between 3 and 8 kg.

21. Pressed anodes obtained from tantalum powder according to claim 4, characterized in that the anode breaking strength measured according to Chatillon at a pressed density of 5.0 g/cm$^3$ and for an anode weight of 0.521 kg is between 3 and 8 kg.

22. Pressed anodes obtained from tantalum powder according to claim 5, characterized in that the anode breaking strength measured according to Chatillon at a pressed density of 5.0 g/cm$^3$ and for an anode weight of 0.521 kg is between 3 and 8 kg.

23. Pressed anodes obtained from tantalum powder according to claim 6, characterized in that the anode breaking strength measured according to Chatillon at a pressed density of 5.0 g/cm$^3$ and for an anode weight of 0.521 kg is between 3 and 8 kg.

24. Pressed anodes obtained from tantalum powder according to claim 7, characterized in that the anode breaking strength measured according to Chatillon at a pressed density of 5.0 g/cm$^3$ and for an anode weight of 0.521 kg is between 3 and 8 kg.

25. Sintered anode obtained by sintering pressed tantalum powder according to claim 3 at temperatures of 1150 to 1300° C. and forming at 16 to 30 volts, characterized in that they have specific charges of 80,000 to 170,000 $\mu$FV/g.

26. Sintered anode obtained by sintering pressed tantalum powder according to claim 4 at temperatures of 1150 to 1300° C. and forming at 16 to 30 volts, characterized in that they have specific charges of 80,000 to 170,000 $\mu$FV/g.

27. Sintered anode obtained by sintering pressed tantalum powder according to claim 5 at temperatures of 1150 to 1300° C. and forming at 16 to 30 volts, characterized in that they have specific charges of 80,000 to 170,000 $\mu$FV/g.

28. Pressed anodes obtained from tantalum powder according to any one of claims 21 to 24, characterized in that the anode breaking strength measured according to Chatillon at a pressed density of 5.0 g/cm$^3$ and for an anode weight of 0.521 is between 4 and 7 kg.

29. Tantalum powder according to either of claim 1 or 2, with a fluorine content of less than 5 ppm.

30. Pressed anodes obtainable from tantalum powders according to either of claim 1 or 2, characterized in that the anode breaking strength measured according to Chatillon at a pressed density of 5.0 g/cm$^3$ and for an anode weight of 0.521 kg is between 4 and 7 kg.

* * * * *